Jan. 29, 1946.   T. M. FERRILL, JR   2,393,624
NAVIGATION SYSTEM
Filed Sept. 1, 1943
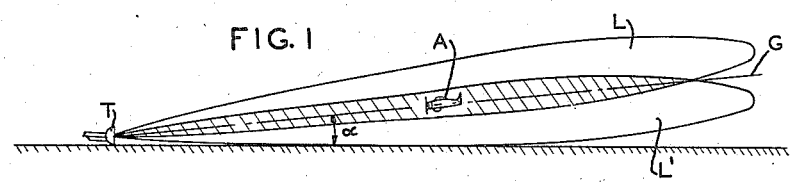
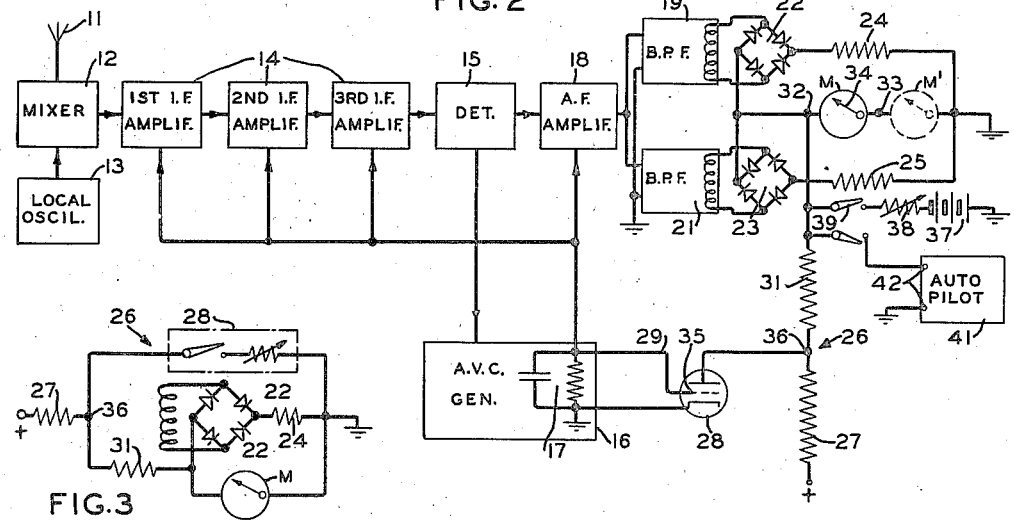
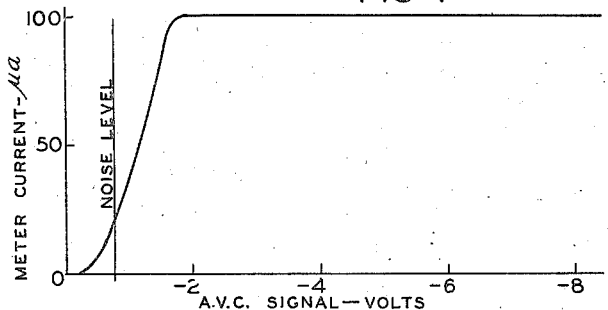
INVENTOR
T. M. FERRILL, JR.
BY
Herbert H. Thompson
his ATTORNEY Patented Jan. 29, 1946

2,393,624

UNITED STATES PATENT OFFICE 2,393,624

NAVIGATION SYSTEM

Thomas M. Ferrill, Jr., Hempstead, N. Y., assignor to Sperry Gyroscope Company, Inc., a corporation of New York Application September 1, 1943, Serial No. 500,748

12 Claims. (Cl. 250—11)

This invention relates to navigation systems, and more particularly to safety provisions for navigation systems for use on dirigible craft.

The invention is especially concerned with causing a craft to deviate from an established radio beacon course, wherever the craft fails to receive the beacon signals. Although the present invention is adapted for use on various types of craft following various types of radio beams, it is herein specifically described as applied to air craft, following equi-signal glide paths when making instrument landings, although it will be understood that the principles have more general use.

A pilot is advised that his craft is making a proper descent along an equi-signal glide path when the landing instrument or glide path meter, being unenergized, provides a neutral or "on course" indication. It will be apparent, however, that such an instrument may mislead the pilot as to the location of his plane, should a failure in the reception of the glide path signals, followed by a natural deviation of the craft, leave the meter in the same neutral position. Thus, assuming that the reception of glide path signals were interrupted for any reason during a normal landing operation, the plane might deviate dangerously downward from the glide path while the landing instrument continued to denote a normal approach condition. The present improved system provides an appropriate signal to the pilot in the event of transmitter or receiver trouble.

The difficulty is not ordinarily encountered with constant intensity glide path systems wherein the craft follows a curved path along which the field strength of the radiated energy remains constant. In such systems, the meter is energized from a fly-up indication in the "at rest" position according to the field intensity of the radiated pattern and is adjusted to provide a neutral or "on course" indication whenever the craft is disposed along the desired constant intensity path, the meter being biased downward from the fly-up position as a function of the glide path signal strength. If for any reason, reception of the glide path signals should fail, the meter pointer is restored to the "at rest" position to provide a suitable indication to the pilot to fly his craft in an upward direction out of any possible immediate danger from collision with obstacles near the ground, until the trouble has been identified and suitable protective measures have been adopted.

In other types of instrument landing systems, such as those including the equi-signal system, wherein the glide path is defined as the axis of a plurality of intersecting lobes of radiant energy, the landing instrument fails to provide any sort of warning if the glide path signals should no longer be received while the craft is following the glide path. A proposal merely to shift the landing instrument pointer so as to provide a fly-up indication for equi-signal systems when the instrument is unenergized, is unsuitable because it requires the craft to fly above the intended equi-signal course to obtain a displacement signal capable of neutralizing the pointer shift (to restore the pointer to an on-course position), at which time the on-course indication manifestly is in error.

It is the purpose of the present invention to provide a suitable warning for the pilot in the event of failure of either the glide path transmitter or the receiver, which warning provides the pilot with an indication, such as a fly-up signal, that induces a corrective movement of the craft so as to remove it from immediate danger of collision.

The principal objects of the present invention are: to provide an improved system of course-departure indication for craft following a radio beam; to provide a fly-up signal device and method for equi-signal instrument landing systems in the event of failure of reception of the instrument-landing signals; to provide in such a system a course-departure indicator initially biased to provide a fly-up signal, and to provide neutralizing means for the bias conditioned upon attainment of automatic volume control potential above a predetermined level; and to provide a system for biasing an instrument pointer so as to provide a fly-up indication and for neutralizing the bias so that the signal across the indicator is zero when the pointer is in the neutral position. These and other objects will become more apparent from the following description and from the accompanying drawing, disclosing typical embodiments of the present invention.

In the drawing, Fig. 1 is a diagram illustrating the lobes of a two-beam equi-signal type landing system, with an airplane shown disposed along the equi-signal glide path.

Fig. 2 is a diagram disclosing the elements of an instrument-landing superheterodyne receiver embodying principles of the present invention.

Fig. 3 is a simplified electrical diagram illustrating the equivalent circuit of the portion of the receiver incorporating the present improvements, and Fig. 4 is a graph illustrating the relation between the current flowing through the meter and the automatic volume control signal level.

Generally speaking, the invention comprehends initially disposing the pointer of a landing instrument away from the neutral position to provide a fly-up indication, and restoring the pointer to a neutral position by neutralizing signals derived from the automatic volume control means of the instrument landing receiver. The pointer may be biased to the fly-up position either electrically or mechanically, but in either case the bias is exactly neutralized in response to the formation of an automatic volume control voltage in excess of a predetermined value.

The present system of fly-up indication for aircraft is especially adapted for those equi-signal instrument landing systems having overlapping lobes of radiant energy for defining a glide path. A system of this general type is disclosed in W. T. Cooke et al. Patent No. 2,307,023, dated January 5, 1943. The present invention is shown applied to a system having an upper lobe L and a lower lobe L' comprising directive radiation patterns individually modulated as by audio signals of 900 and 600 cycles per second, respectively. The line along which the respective audio signals are received with equal intensity defines a glide path G which may extend at an angle α of from one to several degrees relative to the horizontal. Ships such as aircraft A may be guided by the signals from a transmitter T at an effective distance therefrom limited by the field strength, receiver sensitivity, and the like, the range ordinarily extending from 20 to over 100 miles. Assuming an angle α of 2°, the glide path G attains an altitude of over 3,500 feet when 20 miles distant from the transmitter, while when 100 miles distant, the glide path extends upward to about 25,000 feet when considering the earth curvature. Accordingly, at the distance at which most craft initially encounter the landing beam, the glide path is located above the craft so that the plane initially encounters the lower lobe L' and thereupon is directed upwardly toward the glide path, in response to appropriate indication by the landing instrument, as will more fully appear.

The invention may be better understood by referring to Fig. 2, wherein the elements of a superheterodyne receiver have been illustrated schematically. The received signals are conducted from a receiving antenna 11 to a mixer 12 where the signals are combined with the signals from a local oscillator 13 to provide intermediate frequency signals. These are conducted through a series of intermediate frequency amplifiers 14 to the detector 15 having associated therewith an automatic volume control generator control 16 utilizing an R—C network 17 for the development of a direct-current potential which is a function of the carrier strength. The automatic volume control voltage which hereinafter may be referred to as A. V. C. voltage, is applied as a negative bias to the intermediate frequency amplifiers 14, and to the audio frequency amplifier 18, if desired, as for course softening effects, as more fully described in T. M. Ferrill, Jr., applications Serial Nos. 478,013, filed March 4, 1943, and 483,819, filed April 20, 1943.

The respective low frequency and high frequency audio components of the detected and amplified signal are segregated by means of bandpass filters 19 and 21 respectively, energized as shown by the audio frequency amplifier. The signals representing the individual components are rectified as by bridge-connected copper oxide rectifier units 22 and 23 providing a direct current circuit for a landing instrument or meter M having one terminal 32 connected to one pole of the rectifiers 22 and 23, and the other terminal 33 connected to the opposite pole of each of the rectifiers through resistors 24 and 25, respectively. A second meter M' may be connected as shown where dual installation is desired for the convenience of a co-pilot. The rectifiers are connected to the meter M so that the current from the respective units is urged to flow in opposite directions through the meter M, whereby a pointer deflection results from unequal signal intensities encountered when the craft is above or below the glide path G. Accordingly, when the audio components are equal, as when the craft is receiving signals on the equi-signal line, the currents from the rectifiers neutralize one another, and the meter M is unenergized. Heretofore this has resulted in a neutral indication. It will be apparent, however, that the effect on the meter and the resulting indication is the same whether the meter is exposed to strong balanced signals, or to no signals at all. Thus, if the receiver should fail to generate audio voltages in the rectifiers 22 and 23, because of either, failure in the transmission of the signals, or failure in the reception of the signals, the craft might deviate downwardly without the meter pointer 34 departing from its neutral position to provide a warning, and the pilot might thereby receive a false impression of proper gliding along the path.

This disadvantage is readily overcome in the present invention by applying an initial bias to the meter M, so that a fly-up signal is produced whenever the meter is unenergized. The meter may be restored to a neutral-indication position by signals conditioned upon the generation of an A. V. C. voltage above a predetermined level.

Alternative arrangements for producing this result are shown in Fig. 2. The simpler appearing provision comprises mechanically shifting or biasing the meter pointer 34 upward from a midscale or neutral position to the position shown in Fig. 2, so that the meter pointer may be restored to its neutral position electrically whenever the carrier signal strength exceeds a predetermined minimum value. This may be accomplished by mounting the pointer in an upper position to provide a fly-up signal when the meter is unenergized, either by biasing the pointer movement and spring during assembly, or by adjusting the usual exposed regulating screw to shift the pointer upwardly. The degree of movement imparted is not critical provided the amount is accurately determined so that the proper compensating current may be applied. Usually, a pointer bias of the order of one-half to two-thirds full scale deflection will be ample. With a 150-microampere meter, these positions will require 75 to 100 microamperes of neutralizing current to restore the meter pointer to its neutral or on-course position.

The bias neutralizing arrangement may include an impedance network 26, shown in simplified form in Fig. 3, comprising a fixed resistor 27 connected to terminal 36 and serving as the plate load resistor of a high mu triode 28, the grid 35 of which is biased by the A. V. C. voltage through wire 29. A second fixed resistor 31 continues from the plate end of resistor 27 to the meter terminal 32.

The operation of the device may best be understood by applying specific values to the circuit elements. The triode 28 may comprise a tube of the general style of a 6SF5, having a mu of 100. Resistor 27 may be 1 megohm, while resistor 31 may be ½ megohm. Assuming the meter to provide full scale deflection at 150 microamperes with the pointer mechanically biased to require 100 microamperes of neutralizing current, and assuming 300 volts positive potential to be applied to the free end of resistor 27 as shown, the device is capable of operation in the following manner.

Let us assume that a craft flying at three thousand feet altitude reaches a point twenty miles from a transmitter T and that its receiver is there receptive to radiation in the lower lobe L'. Since the craft normally approaches the beam from a point below the glide path, turning on the receiver during an approach provides a fly-up indication by virtue of the preponderant energy from the lower lobe L' producing a flow of current through the meter M. When the craft climbs to the glide path, the meter pointer 34 becomes restored to a neutral or on-course position, provided the receiver is operated by glide path signals of suitable strength. If the pilot knows he is approaching the glide path at an appreciable distance from the transmitter, he may disregard the initial fly-up signal appearing when the receiver is turned on by flying at a constant altitude until the craft reaches the zone of the glide path corresponding with the craft altitude. Within the normal zone of operation of the system the carrier intensity is sufficient to produce an automatic volume signal of from −2 to −10 volts, which voltage is applied to the grid 35 to neutralize the fly-up indication, as will appear.

The circuit 26 operates on the principle that when the A. V. C. voltage is sufficiently high, the full neutralizing voltage is applied to the meter M so as to restore the pointer to its neutral position. Conversely, when the A. V. C. voltage is insufficient, signifying trouble either in the transmitter T or in the portion of the receiver preceding the A. V. C. generator, or operation of the receiver beyond the region of adequate field intensity, little or no neutralizing voltage is applied to the meter, and the pointer 34 is left in the fly-up position.

As more clearly shown in Fig. 3, the meter M is controlled by the voltage between the connection 36 and ground. The triode 28 operates as a variable resistance connected in series with resistor 27, and in parallel with a fixed resistance circuit including the meter and one leg of the rectifier circuit. Accordingly, the meter-operating voltage is controlled by the voltage drop across resistor 27 which in turn is determined by the condition of the triode 28. When the resistance of the triode is low, as when the grid bias created by the automatic volume control generator is somewhat less than two volts, the triode 28 becomes conductive and permits the passage of more current through resistor 27, thereby reducing the voltage operating the meter M and providing little or no signal to neutralize the fly-up indication. This condition is illustrated graphically in Fig. 4, wherein neutralizing current values in microamperes are plotted as ordinates against A. V. C. bias voltages as abscissae. In the example shown, the meter M and the one conductive leg of the band-pass filter and rectifier paralleling the meter are of negligible resistance when compared with the 1½ megohms comprising resistors 27 and 31, so that they may be ignored without introducing appreciable error when computing the current through resistor 27.

Assuming that the A. V. C. voltage is approximately one-half volt when the craft approaches the lobe L', the static plate resistance of tube 28 may approximate 150,000 ohms, thereby considerably reducing the equivalent resistance of the parallel circuit between the connection 36 and ground. Substantially the entire voltage drop in circuit 26 therefore occurs across resistor 27, leaving a potential of the order of 25 volts between the connection 36 and ground. If resistor 31 comprises one-half megohm, the current flow therethrough approximates 50 microamperes. Assuming, as is reasonable, that the current divides equally between the meter M and the parallel path incorporating the rectifier 22, the correction or neutralizing current in the foregoing instance is 25 microamperes, resulting in no substantial neutralization of the bias applied to the pointer 34, and thereby advising the pilot of abnormal system operation, or of instrument landing signals that are too weak.

With the carrier intensity in the normal operating range, the A. V. C. voltage exceeds −2 volts, and the triode 28 is biased substantially to cut-off, corresponding roughly to an open switch in the element 28 shown in Fig. 3. Hence, no current flows through tube 28, and the full current flows through resistor 27 and 31. With 1½ megohms in series with a 300-volt supply, the current flow amounts to 200 microamperes. Since the current divides between the meter and the circuit containing the rectifier 23, only approximately 100 microamperes passes through the meter. Since this current flows in such a direction as to neutralize the mechanical bias, the pointer 34 is restored to a neutral or on-course position. It will be apparent from the discussion and from Fig. 4 that further increase in the carrier intensity produces no change in the meter current. Hence, the neutralizing current cannot exceed the amount predetermined to neutralize the bias.

An alternative arrangement disclosed in Fig. 2 comprises substitution of electrical bias for the pointer 34 instead of mechanical bias. Use may be made of a meter M having a centralized pointer, that is, one that seeks a mid-scale or neutral position when no current flows through the meter. The pointer may be biased to the fly-up position by applying the necessary signal electrically, that is, by passing a current of proper magnitude and in the proper direction through the meter M. For this purpose use may be made of a battery 37 in series with a variable resistor 38, and having a control switch 39, all in series across the meter terminals 32 and 33. When switch 39 is closed, the proper current is obtained by adjusting the resistor 38. This modification of the invention offers some advantage, in that when the meter pointer is restored to its neutral position, no current flows through the meter, and hence no voltage appears across its terminals. Accordingly, an automatic pilot 41 of any conventional design may have its pitch-controlling terminals 42 energized by the meter voltage. Since the electrical bias is neutralized when the craft is on course so that no voltage appears across the meter, no signal likewise appears on the automatic pilot terminals 42, and the course of the craft is not altered.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A fly-up indicator for equi-signal instrument landing systems comprising glide path indicator means biased to provide a fly-up signal, an instrument landing receiver having automatic volume control means, and means responsive to said automatic volume control means for neutralizing said bias.

2. In an instrument-landing system for aircraft, the combination comprising means for receiving directive radio signals defining a glide path for said aircraft, said means including automatic volume-control means, an indicator responsive to deviations of said aircraft from said glide path, and a neutral position control means for said indicator responsive to said automatic volume-control means.

3. In an instrument-landing aircraft receiver, the combination comprising a glide path meter, automatic volume-control means for said receiver, and control means for adjusting the neutral position of said meter from a fly-up position to a predetermined normal position in response to any signal above a predetermined level supplied by said automatic volume-control means.

4. In an instrument landing system for aircraft, a radio receiver, a glide path meter being responsive to received glide path signals, and having a pointer denoting the position of said aircraft relative to said glide path, automatic volume control means for said receiver, and means for displacing the neutral position of said pointer from a weak-signal fly-up position to a predetermined normal position in response to any signal level above a predetermined value supplied by said automatic volume control means.

5. In an instrument landing system, an instrument landing radio receiver having automatic volume control, an indicator biased to provide a fly-up signal, and means conditioned on at least a predetermined automatic volume control voltage for neutralizing said indicator bias.

6. In an instrument landing system, an instrument landing radio receiver having automatic volume control, an indicator biased to provide a fly-up signal, and electronic means operative by at least a predetermined automatic volume control voltage for neutralizing said indicator bias.

7. A method of providing a fly-up indication in an instrument landing receiver glide-path indicator, comprising biasing said indicator initially to provide a fly-up signal, and neutralizing said bias in response to automatic volume control signals above a predetermined level from said receiver.

8. In an instrument landing system for aircraft, a receiver having automatic volume control, an electric indicator for denoting the position of said aircraft relative to a predetermined glide path, said indicator having a pointer mechanically biased to provide a fly-up signal, impedance means controlling the flow of current through said indicator, and electronic means responsive to automatic volume control signals and operative on said impedance means to neutralize said bias.

9. In an instrument landing system for aircraft, a receiver having automatic volume control, an electric indicator for denoting the position of said aircraft relative to a predetermined glide path, constant biasing means operative on said indicator to provide an initial fly-up signal, and means responsive to automatic volume control signals above a predetermined level for exactly counteracting said biasing means.

10. The combination as claimed in claim 9, including an automatic pilot for controlling said aircraft, said pilot having pitch control terminals responsive to the signals applied to said indicator.

11. In an instrument landing system for aircraft, a receiver having automatic volume control, an electric indicator for denoting the position of said aircraft relative to a predetermined glide path, a constant electric bias signal operative on said indicator to provide an initial fly-up indication, impedance means controlling the flow of current through said indicator, and electronic means responsive to automatic volume control signals and operative on said impedance means to neutralize said constant bias signal.

12. The combination as claimed in claim 11, including an automatic pilot for controlling said aircraft, said pilot having pitch control terminals responsive to the signals applied to said indicator.

THOMAS M. FERRILL, Jr.